Figure 1:
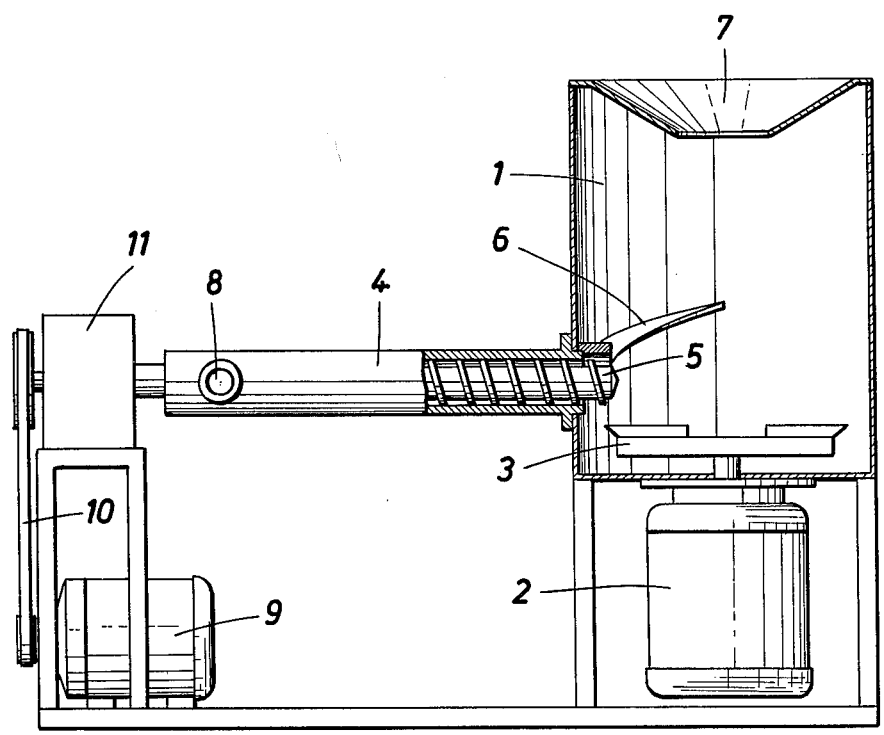

United States Patent [19]

Schulz et al.

[11] Patent Number: 4,460,277
[45] Date of Patent: Jul. 17, 1984

[54] APPARATUS FOR PROCESSING SYNTHETIC THERMOPLASTIC MATERIAL

[75] Inventors: Helmuth Schulz, St. Florian; Helmut Bacher, Linz, both of Austria

[73] Assignee: Oesterreichische Schiffswerften Aktiengesellschaft, Linz, Austria

[21] Appl. No.: 531,199

[22] Filed: Sep. 12, 1983

Related U.S. Application Data

[63] Continuation of Ser. No. 284,056, Jul. 16, 1981, abandoned.

[30] Foreign Application Priority Data

Jul. 31, 1980 [AT] Austria ................................. 3961/80

[51] Int. Cl.³ ........................... B29B 1/10; B29B 1/12
[52] U.S. Cl. .................................... 366/76; 241/101.2;
366/91; 366/155; 366/186; 366/195; 366/290;
425/202; 425/205; 425/305.1
[58] Field of Search ................... 366/186, 50, 77, 195,
366/196, 144, 145, 307, 306, 302, 133, 189, 76,
91, 155, 290; 222/408, 270, 236; 241/186 A, 188
R, 278 R, 101.2; 425/202, 204, 205, 305.1

[56] References Cited

U.S. PATENT DOCUMENTS 1,879,828  9/1932  Smith .................................. 366/194
3,506,202  4/1970  Cumpston ....................... 241/188 R
3,867,194  2/1975  Straube .............................. 366/186
4,222,728  9/1980  Bacher ................................. 366/77

FOREIGN PATENT DOCUMENTS

3961/80   7/1980  Austria .
H 11105  10/1955  Fed. Rep. of Germany ...... 366/186
132293    9/1978  German Democratic
                  Rep. ..................................... 425/202

Primary Examiner—Philip R. Coe
Attorney, Agent, or Firm—Kurt Kelman

[57] ABSTRACT

Apparatus for processing synthetic thermoplastic material comprises a receiver having a vertical axis, a disintegrating and mixing tool which is disposed in the receiver near the bottom thereof and rotatable about the axis of the receiver, and at least one screw extruder, which extends through an opening in the shell of the receiver into the latter adjacent to the disintegrating and mixing tool. To ensure that the screw extruder can be filled uniformly and that such filling will be independent in a high degree from the level to which the receiver is filled, the screw extruder extends at least approximately radially of the axis of the receiver and that end of the screw extruder which extends into the receiver is axially spaced above the disintegrating and mixing tool.

1 Claim, 3 Drawing Figures

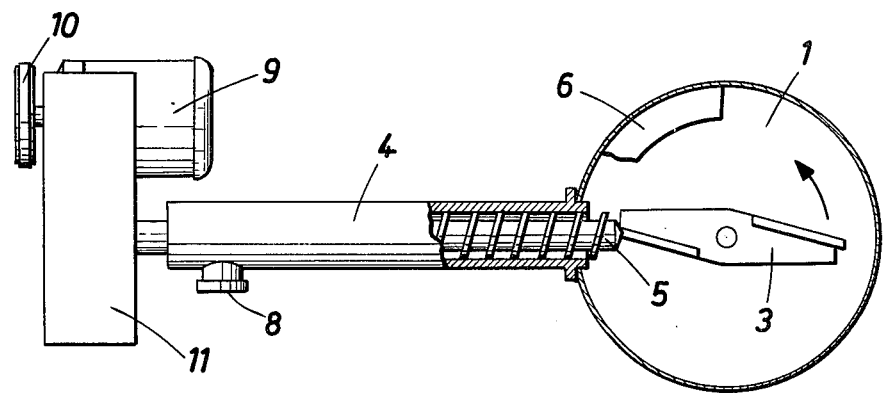
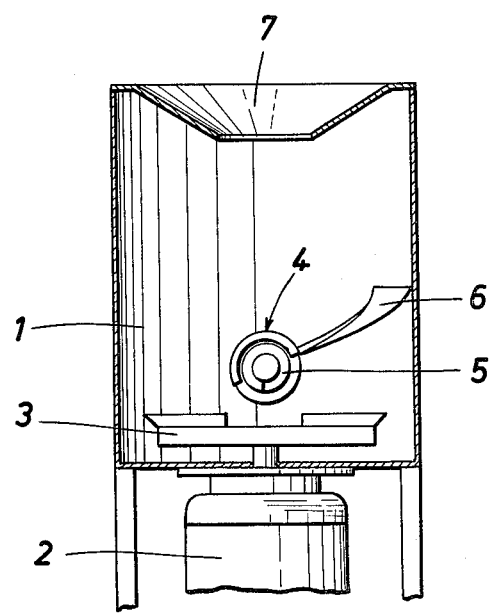

APPARATUS FOR PROCESSING SYNTHETIC THERMOPLASTIC MATERIAL

This application is a continuation of application Ser. No. 284,056 filed July 16, 1981, and now abandoned.

This invention relates to apparatus for processing synthetic thermoplastic material, comprising a receiver having a vertical axis, a disintegrating and mixing tool which is disposed in the receiver near the bottom thereof and rotatable about the axis of the receiver, and at least one screw extruder, which extends through an opening in the shell of the receiver into the latter adjacent to the disintegrating and mixing tool.

U.S. Pat. No. 4,222,728 discloses an apparatus for processing synthetic thermoplastic material wherein the plastic material is charged from above into the receiver and near the bottom of the receiver is engaged, disintegrated and thoroughly mixed by the disintegrating and mixing tool and is thus heated. The disintegrating and mixing tool moves the particles of the material along the shell of the receiver about the vertical axis thereof. As a result, the particles are also tumbled in radial planes so that a good mixing effect is ensured as well as a high thermal efficiency. The plastic material which has thus been heated uniformly delivered to a screw extruder which extends tangentially of the receiver and communicates with the latter through an opening in the shell. As the screw extruder is filled as a result of the centrifugal forces acting on the particles of material, the screw extruder may not be uniformly filled in that known apparatus and the filling of the extruder will depend also on the level to which the receiver is filled.

It is an object of the invention to avoid these disadvantages and so to improve apparatus for processing synthetic thermoplastic material that the screw extruder can be uniformly filled and that this will be independent in a high degree from the level to which the receiver is filled. Besides, the thermal efficiency is further improved.

This object is accomplished according to the invention with a screw extruder which extends at least approximately radially of the axis of the receiver. The screw extruder extends outside the receiver and has an intake end, only the intake end protruding into the receiver and extending in a plane above the plane of the disintegrating and mixing tool.

Because in this arrangement the intake end of the screw extruder which extends into the receiver extends also into the stream of the disintegrated and mixed material, the particles of the material will be forcibly fed to the extruder screw and the pressure under which the extruder is filled will not depend on the centrifugal forces which exist but on the entraining forces exerted by the disintegrating and mixing tool on the stream of the material in the peripheral direction. For this reason, the filling of the extruder screw will be independent to a high degree from the level to which the receiver is filled because it is sufficient to ensure that the intake opening of the screw extruder lies within the stream of revolving material. The fact that the screw extruder is filled under a higher pressure results in a higher thermal efficiency.

To ensure that particles of material moved against the screw extruder cannot give way, a wall for guiding the plastic material to the screw extruder may be provided in the receiver on the inside of the shell thereof, which wall in the direction of rotation of the disintegrating and mixing tool precedes and slopes toward the intake end of the extruder. Adjacent to that guide wall the particles of material will be positively guided by the guide wall toward the intake end of the extruder. This results in an additional compaction of the plastic material. If the particles tend to give way in dependence on the level to which the receiver is filled, i.e., in dependence on the forces which are due to the weight of the overlying layers of material, such dependence can be avoided by the provision of a suitable guide wall. In such case, the filling of the extruder screw will depend only on the entraining pressure applied on the material by the disintegrating and mixing tool in a peripheral direction. This will produce desirable results not only as regards thermal efficiency but also as regards the uniform throughput of the material.

The stream of material fed to the screw of the extruder depends on the axial distance from the guide wall to the disintegrating and mixing tool so that the stream of material to be fed to the screw extruder can also be controlled by a change of that distance. For this purpose the disintegrating and mixing tool can be axially adjustably mounted.

The dynamic pressure which acts on the stream of material owing to the presence of the guide wall will involve a higher temperature of the material. To ensure that the plastic material at such higher temperature will not stick to the guide wall, the latter is preferably cooled, as is known for the receiver.

An embodiment of the invention is shown by way of example on the drawing, in which FIG. 1 is a vertical sectional view taken on a plane which includes the axis of the extruder and shows apparatus which embodies the invention and serves to process synthetic thermoplastic material, FIG. 2 is a vertical sectional view taken on a plane that is normal to the axis of the extruder of FIG. 1 and FIG. 3 is a horizontal sectional view showing the apparatus.

The apparatus which is shown comprises a receiver 1 and a disintegrating and mixing tool 3, which is mounted in the receiver 1 near the bottom thereof for rotation about the axis of the receiver and is adapted to be driven by a motor 2. The intake end 5 of a screw extruder 4 protrudes into the receiver 1 and is axially spaced above the disintegrating and mixing tool 3. The axis of the screw extends radially of the axis of the receiver, as is particularly apparent from FIG. 3.

A wall 6 for guiding the plastic material adjoins the inside surface of the shell of the receiver 1 and precedes the intake end 5 of the receiver in the sense of rotation of the disintegrating and mixing tool 3. The guide wall 6 slopes toward the intake end 5 of the extruder. That guide wall as well as the receiver can be cooled by cooling water flowing in suitable passages.

The synthetic thermoplastic material to be processed is charged into the receiver 1 from above through a feed hopper 7 and moves into the range of action of the disintegrating and mixing tool, which disintegrates and mixes the material and moves it in a circle along the shell of the receiver. The revolving particles of the material are simultaneously tumbled in radial planes. As a result of their revolution about the axis of the receiver, the particles of material are forced against the shell of the receiver and enter the region of the guide wall 6, which positively guides them to the intake end 5 of the screw extruder. In this arrangement the extruder protruding into the stream of material is filled under a higher pressure and those particles of material which have been forced between the threads of the screw will be cut by said threads out of the stream of material. This will result in a uniform and effective filling of the screw extruder 4 regardless of the level to which the receiver 1 is filled. In front of the intake end 5 of the screw extruder, the guide wall 6 defines a space in which the material will be subjected to a dynamic pressure so that the screw extruder will be charged under uniform pressure. The disintegrating and mixing tool 3 is axially adjustable so that the dynamic pressure can be adjusted for different plastic compositions.

The material which has been plasticized in the extruder can be discharged through a suitable exit opening. The emerging stream of molten material can be filtered in known manner by means of a strainer and can be extruded in various shapes.

The screw extruder is driven by a motor 9 which, by means of a belt drive 10 and a gear train 11, is connected to the screw of the extruder.

What is claimed is:

1. In apparatus for processing synthetic thermoplastic material, which comprises an upright receiver having a vertical axis, a shell surrounding the axis and defining an opening, a bottom wall and an upper end opposite the bottom wall, the upper end being adapted to receive the synthetic thermoplastic material, a disintegrating and mixing tool disposed in the receiver near the bottom wall thereof and mounted for rotation in a horizontal plane about the vertical axis, and drive means for rotating the tool in an operating direction:

the improvement of a screw extruder extending substantially radially with respect to the vertical axis outside of the receiver shell and having an intake end, only the intake end protruding through the opening into the receiver and the intake end extending in a plane above the plane of the disintegrating and mixing tool, and a baffle having a lower end portion disposed close to the intake end of the screw extruder for guiding the material thereto, the baffle being disposed in the receiver adjoining the shell and sloping in said direction towards the intake end of the screw extruder.

* * * * *